(12) United States Patent
Bakalash et al.

(10) Patent No.: US 12,573,127 B2
(45) Date of Patent: Mar. 10, 2026

(54) SYSTEM FOR NON-PLANAR SPECULAR REFLECTIONS IN HYBRID RAY TRACING

(71) Applicant: Snap Inc., Santa Monica, CA (US)

(72) Inventors: Reuven Bakalash, Shdema (IL); Ron Weitzman, Tel Aviv (IL); Elad Haviv, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 100 days.

(21) Appl. No.: 18/732,242

(22) Filed: Jun. 3, 2024

(65) Prior Publication Data

US 2024/0378794 A1 Nov. 14, 2024

Related U.S. Application Data

(63) Continuation of application No. 17/654,714, filed on Mar. 14, 2022, now Pat. No. 12,051,145, which is a continuation of application No. 17/183,395, filed on Feb. 24, 2021, now Pat. No. 11,302,058, which is a continuation of application No. 16/909,063, filed on Jun. 23, 2020, now Pat. No. 10,950,030, which is a continuation of application No. 16/662,657, filed on Oct. 24, 2019, now Pat. No. 10,699,468, which is a continuation-in-part of application No. 16/004,348, filed on Jun. 9, 2018, now Pat. No. 10,614,612, and (Continued)

(51) Int. Cl.
G06T 15/06 (2011.01)
G06T 15/00 (2011.01)
G06T 15/20 (2011.01)
G06T 15/40 (2011.01)

(52) U.S. Cl.
CPC ............ G06T 15/06 (2013.01); G06T 15/005 (2013.01); G06T 15/20 (2013.01); G06T 15/40 (2013.01)

(58) Field of Classification Search
None
See application file for complete search history.

(56) References Cited

U.S. PATENT DOCUMENTS 5,442,733 A 8/1995 Kaufman et al.
5,907,691 A 5/1999 Faget et al.
(Continued)

FOREIGN PATENT DOCUMENTS

WO WO-2015192117 A1 12/2015

OTHER PUBLICATIONS

U.S. Appl. No. 16/662,657 U.S. Pat. No. 10,699,468, filed Oct. 24, 2019, Method for Non-Planar Specular Reflections in Hybrid Ray Tracing.

(Continued)

*Primary Examiner* — Jason A Pringle-Parker
(74) *Attorney, Agent, or Firm* — Schwegman Lundberg & Woessner, P.A.

(57) ABSTRACT

The present invention teaches a real-time hybrid ray tracing system for non-planar specular reflections. The high complexity of a non-planar surface is reduced to low complexity of multiple small planar surfaces. Advantage is taken of the planar nature of triangles that comprise building blocks of a non-planar surface. All secondary rays bouncing from a given surface triangle toward object triangles keep a close direction to each other. A collective control of secondary rays is enabled by this closeness and by decoupling secondary rays from primary rays. The result is a high coherence of secondary rays.

20 Claims, 12 Drawing Sheets

Related U.S. Application Data a continuation-in-part of application No. 16/444,431, filed on Jun. 18, 2019, now Pat. No. 10,614,614, and a continuation-in-part of application No. 16/444,464, filed on Jun. 18, 2019, now Pat. No. 10,565,776.

(60) Provisional application No. 62/755,568, filed on Nov. 5, 2018, provisional application No. 62/755,548, filed on Nov. 4, 2018.

(56) References Cited

U.S. PATENT DOCUMENTS

| | | | |
|---|---|---|---|
| 6,359,618 | B1 | 3/2002 | Heirich |
| 6,512,517 | B1 | 1/2003 | Knittel et al. |
| 6,621,925 | B1 | 9/2003 | Ohmori et al. |
| 6,911,984 | B2 | 6/2005 | Sabella et al. |
| 6,967,663 | B1 | 11/2005 | Bastos et al. |
| 7,212,207 | B2 | 5/2007 | Green et al. |
| 7,561,163 | B1 | 7/2009 | Johnson |
| 8,169,439 | B2 | 5/2012 | Luick et al. |
| 9,424,685 | B2 | 8/2016 | Howson et al. |
| 9,483,865 | B2 | 11/2016 | Bakalash |
| 9,558,530 | B2 | 1/2017 | Bakalash |
| 9,576,389 | B2 | 2/2017 | Lee et al. |
| 9,607,426 | B1 | 3/2017 | Peterson |
| 9,672,654 | B2 | 6/2017 | Shin et al. |
| 9,697,640 | B2 | 7/2017 | Obert et al. |
| 9,741,160 | B2 | 8/2017 | Bakalash |
| 10,204,442 | B2 | 2/2019 | Bakalash et al. |
| 10,217,268 | B2 | 2/2019 | Bakalash et al. |
| 10,229,527 | B2 | 3/2019 | Bakalash et al. |
| 10,297,068 | B2 | 5/2019 | Bakalash et al. |
| 10,332,304 | B1 | 6/2019 | Bakalash |
| 10,380,785 | B2 | 8/2019 | Bakalash et al. |
| 10,395,415 | B2 | 8/2019 | Bakalash |
| 10,395,416 | B2 | 8/2019 | Bakalash |
| 10,403,027 | B2 | 9/2019 | Bakalash et al. |
| 10,410,401 | B1 | 9/2019 | Bakalash et al. |
| 10,565,776 | B2 | 2/2020 | Bakalash |
| 10,614,612 | B2 | 4/2020 | Bakalash et al. |
| 10,614,614 | B2 | 4/2020 | Bakalash |
| 10,699,468 | B2 | 6/2020 | Bakalash et al. |
| 10,789,759 | B2 | 9/2020 | Bakalash et al. |
| 10,818,072 | B2 | 10/2020 | Bakalash et al. |
| 10,930,053 | B2 | 2/2021 | Bakalash et al. |
| 10,950,030 | B2 | 3/2021 | Bakalash et al. |
| 11,017,582 | B2 | 5/2021 | Bakalash et al. |
| 11,017,583 | B2 | 5/2021 | Bakalash et al. |
| 11,302,058 | B2 | 4/2022 | Bakalash et al. |
| 11,481,955 | B2 | 10/2022 | Bakalash et al. |
| 11,508,114 | B2 | 11/2022 | Bakalash et al. |
| 12,008,704 | B2 | 6/2024 | Bakalash et al. |
| 12,051,145 | B2 | 7/2024 | Bakalash et al. |
| 12,148,087 | B2 | 11/2024 | Bakalash et al. |
| 2007/0257911 | A1 | 11/2007 | Bavoil et al. |
| 2008/0088622 | A1 | 4/2008 | Shearer |
| 2008/0100617 | A1 | 5/2008 | Keller et al. |
| 2008/0122846 | A1 | 5/2008 | Brown et al. |
| 2008/0231627 | A1 | 9/2008 | Shearer |
| 2009/0073167 | A1 | 3/2009 | Brown et al. |
| 2009/0073187 | A1 | 3/2009 | Rampson et al. |
| 2009/0102844 | A1 | 4/2009 | Deparis |
| 2009/0128552 | A1 | 5/2009 | Fujiki et al. |
| 2009/0128562 | A1 | 5/2009 | Mccombe et al. |
| 2009/0167763 | A1 | 7/2009 | Waechter et al. |
| 2009/0213115 | A1 | 8/2009 | Keller et al. |
| 2010/0053162 | A1 | 3/2010 | Dammertz et al. |
| 2010/0060637 | A1 | 3/2010 | Shearer |
| 2010/0079457 | A1 | 4/2010 | Tavenrath |
| 2010/0164948 | A1 | 7/2010 | Kho et al. |
| 2010/0239185 | A1 | 9/2010 | Fowler et al. |
| 2011/0066682 | A1 | 3/2011 | Aldunate et al. |
| 2012/0069023 | A1 | 3/2012 | Hur et al. |
| 2012/0169728 | A1 | 7/2012 | Mora |
| 2012/0213430 | A1 | 8/2012 | Nutter et al. |
| 2013/0120385 | A1 | 5/2013 | Krishnaswamy et al. |
| 2013/0190602 | A1 | 7/2013 | Liao et al. |
| 2014/0049539 | A1 | 2/2014 | Lee et al. |
| 2014/0078143 | A1 | 3/2014 | Lee et al. |
| 2014/0375641 | A1 | 12/2014 | Bakalash |
| 2014/0375645 | A1 | 12/2014 | Bakalash |
| 2015/0042655 | A1 | 2/2015 | Gautron et al. |
| 2015/0109302 | A1 | 4/2015 | Lee et al. |
| 2015/0172641 | A1 | 6/2015 | Nakamura et al. |
| 2016/0005209 | A1 | 1/2016 | Dachsbacher |
| 2016/0019672 | A1 | 1/2016 | Bakalash |
| 2016/0027204 | A1 | 1/2016 | Lee et al. |
| 2016/0055608 | A1 | 2/2016 | Frascati et al. |
| 2016/0155258 | A1 | 6/2016 | Bakalash |
| 2016/0239994 | A1 | 8/2016 | Chung et al. |
| 2016/0284118 | A1 | 9/2016 | Howson et al. |
| 2016/0292908 | A1 | 10/2016 | Obert |
| 2017/0061674 | A1 | 3/2017 | Lee et al. |
| 2017/0103567 | A1 | 4/2017 | Peterson |
| 2017/0109931 | A1 | 4/2017 | Knorr et al. |
| 2017/0178398 | A1 | 6/2017 | Afra et al. |
| 2017/0236247 | A1 | 8/2017 | Akenine-moller |
| 2017/0236325 | A1 | 8/2017 | Lecocq et al. |
| 2017/0372508 | A1 | 12/2017 | Schoeneman |
| 2018/0350128 | A1 | 12/2018 | Bakalash et al. |
| 2018/0365880 | A1 | 12/2018 | Bakalash et al. |
| 2018/0374255 | A1 | 12/2018 | Bakalash et al. |
| 2018/0374256 | A1 | 12/2018 | Bakalash et al. |
| 2018/0374257 | A1 | 12/2018 | Bakalash et al. |
| 2019/0057544 | A1 | 2/2019 | Lecocq et al. |
| 2019/0147637 | A1 | 5/2019 | Bakalash et al. |
| 2019/0180496 | A1 | 6/2019 | Bakalash |
| 2019/0180497 | A1 | 6/2019 | Bakalash |
| 2019/0188897 | A1 | 6/2019 | Bakalash |
| 2019/0304162 | A1 | 10/2019 | Bakalash |
| 2019/0304163 | A1 | 10/2019 | Bakalash |
| 2019/0378323 | A1 | 12/2019 | Bakalash et al. |
| 2020/0058155 | A1 | 2/2020 | Bakalash et al. |
| 2020/0143581 | A1 | 5/2020 | Bakalash et al. |
| 2020/0175743 | A1 | 6/2020 | Bakalash et al. |
| 2020/0219305 | A1 | 7/2020 | Bakalash et al. |
| 2020/0320773 | A1 | 10/2020 | Bakalash et al. |
| 2020/0380764 | A1 | 12/2020 | Bakalash et al. |
| 2020/0410744 | A1 | 12/2020 | Bakalash et al. |
| 2021/0166463 | A1 | 6/2021 | Bakalash et al. |
| 2021/0201560 | A1 | 7/2021 | Bakalash et al. |
| 2021/0279941 | A1 | 9/2021 | Bakalash et al. |
| 2022/0198740 | A1 | 6/2022 | Bakalash et al. |
| 2023/0017276 | A1 | 1/2023 | Bakalash et al. |
| 2023/0062294 | A1 | 3/2023 | Bakalash et al. |

OTHER PUBLICATIONS

U.S. Appl. No. 16/909,063 U.S. Pat. No. 10,950,030, filed Jun. 23, 2020, Specular Reflections Hybrid Ray Tracing.

U.S. Appl. No. 17/183,395 U.S. Pat. No. 11,302,058, filed Feb. 24, 2021, Method for Non-Planar Specular Reflections in Hybrid Ray Tracing.

U.S. Appl. No. 17/654,714, filed Mar. 14, 2022, Method for Non-Planar Specular Reflections in Hybrid Ray Tracing.

U.S. Appl. No. 15/615,037 U.S. Pat. No. 10,297,068, filed Jun. 6, 2017, Method for Ray Tracing Augmented Objects.

U.S. Appl. No. 16/736,848 U.S. Pat. No. 10,789,759, filed Jan. 8, 2020, Method for Fast Generation of Path Traced Reflections on a Semi-Reflective Surface.

U.S. Appl. No. 16/994,615 U.S. Pat. No. 11,017,582, filed Aug. 16, 2020, Method for Fast Generation of Path Traced Reflections on a Semi-Reflective Surface.

U.S. Appl. No. 15/640,464 U.S. Pat. No. 10,204,442, filed Jul. 1, 2017, System for Ray Tracing Augmented Objects.

U.S. Appl. No. 15/640,466 U.S. Pat. No. 10,229,527, filed Jul. 1, 2017, Method for Fast Intersection of Secondary Rays With Geometric Objects in Ray Tracing.

U.S. Appl. No. 15/640,467 U.S. Pat. No. 10,217,268, filed Jul. 1, 2017, Method for Fast Intersection of Secondary Rays With Geometric Objects in Ray Tracing.

(56) References Cited

OTHER PUBLICATIONS

U.S. Appl. No. 16/275,366 U.S. Pat. No. 10,395,415, filed Feb. 14, 2019, Method of Fast Intersections in Ray Tracing Utilizing Hardware Graphics Pipeline.

U.S. Appl. No. 16/231,520 U.S. Pat. No. 10,403,027, filed Dec. 23, 2018, System for Ray Tracing Sub-Scenes in Augmented Reality.

U.S. Appl. No. 16/275,371 U.S. Pat. No. 10,332,304, filed Feb. 14, 2019, System for Fast Intersection in Ray Tracing.

U.S. Appl. No. 16/275,907 U.S. Pat. No. 10,395,416, filed Feb. 14, 2019, Method for Rendering an Augmented Objects.

U.S. Appl. No. 16/444,464, U.S. Pat. No. 10,565,776, filed Jun. 18, 2019, Method for Fast Generation of Path Traced Reflections on a Semi-Reflective Surface.

U.S. Appl. No. 15/984,359, U.S. Pat. No. 10,380,785, filed May 20, 2018, Path Tracing Method Employing Distributed Accelerating Structures.

U.S. Appl. No. 16/444,431, U.S. Pat. No. 10,614,614, filed Jun. 18, 2019, Path Tracing Method Employing Distributed Accelerating Structures.

U.S. Appl. No. 16/788,845 U.S. Pat. No. 10,818,072, filed Feb. 12, 2020, Multiprocessing System for Path Tracing of Big Data.

U.S. Appl. No. 17/019,274 U.S. Pat. No. 11,017,583, filed Sep. 13, 2020, Multiprocessing System for Path Tracing of Big Data.

U.S. Appl. No. 17/327,690 U.S. Pat. No. 11,508,114, filed May 22, 2021, Distributed Acceleration Structures for Ray Tracing.

U.S. Appl. No. 18/047,546, filed Oct. 18, 2022, Distributed Acceleration Structures for Ray Tracing.

U.S. Appl. No. 16/004,348 U.S. Pat. No. 10,614,612, filed Jun. 9, 2018, Fast Path Traced Reflections for Augmented Reality.

U.S. Appl. No. 16/788,792 U.S. Pat. No. 10,930,053, filed Feb. 12, 2020, System for Fast Reflections in Augmented Reality.

U.S. Appl. No. 17/175,644 U.S. Pat. No. 11,481,955, filed Feb. 13, 2021, System for Photo-Realistic Reflections in Augmented Reality.

U.S. Appl. No. 17/934,735 U.S. Pat. No. 12,008,704, filed Sep. 23, 2022, System for Photo-Realistic Relections in Augmented Reality.

"U.S. Appl. No. 15/009,442, Non Final Office Action mailed Mar. 21, 2017", 9 pgs.

"U.S. Appl. No. 15/009,442, Notice of Allowance mailed Jun. 29, 2017", 5 pgs.

"U.S. Appl. No. 15/009,442, Response filed Jun. 12, 2017 to Non Final Office Action mailed Mar. 21, 2017", 4 pgs.

"U.S. Appl. No. 15/615,037, Final Office Action mailed Jul. 11, 2018", 13 pgs.

"U.S. Appl. No. 15/615,037, Non Final Office Action mailed Sep. 27, 2017", 15 pgs.

"U.S. Appl. No. 15/615,037, Notice of Allowance mailed Jan. 15, 2019", 5 pgs.

"U.S. Appl. No. 15/615,037, Notice of Non-Compliant Amendment mailed Dec. 26, 2017", 3 pgs.

"U.S. Appl. No. 15/615,037, Response filed Jan. 7, 2019 to Final Office Action mailed Jul. 11, 2018", 4 pgs.

"U.S. Appl. No. 15/615,037, Response filed Feb. 21, 2018 to Notice of Non-Compliant Amendment mailed Dec. 26, 2017", 5 pgs.

"U.S. Appl. No. 15/615,037, Response filed Nov. 13, 2017 to Non Final Office Action mailed Sep. 27, 2017", 5 pgs.

"U.S. Appl. No. 15/615,037, Response filed Dec. 31, 2018 to Final Office Action mailed Jul. 11, 2018", 4 pgs.

"U.S. Appl. No. 15/640,464, 312 Amendment filed Dec. 10, 2018", 3 pgs.

"U.S. Appl. No. 15/640,464, Final Office Action mailed Dec. 27, 2017", 14 pgs.

"U.S. Appl. No. 15/640,464, Non Final Office Action mailed Mar. 30, 2018", 11 pgs.

"U.S. Appl. No. 15/640,464, Non Final Office Action mailed Sep. 27, 2017", 17 pgs.

"U.S. Appl. No. 15/640,464, Notice of Allowance mailed Oct. 26, 2018", 5 pgs.

"U.S. Appl. No. 15/640,464, PTO Response to Rule 312 Communication mailed Dec. 13, 2018", 2 pgs.

"U.S. Appl. No. 15/640,464, Response filed Mar. 12, 2018 to Final Office Action mailed Dec. 27, 2017", 1 pg.

"U.S. Appl. No. 15/640,464, Response filed Nov. 13, 2017 to Non Final Office Action mailed Sep. 27, 2017", 6 pgs.

"U.S. Appl. No. 15/640,466, Ex Parte Quayle Action mailed Oct. 15, 2018", 4 pgs.

"U.S. Appl. No. 15/640,466, Final Office Action mailed Apr. 3, 2018", 9 pgs.

"U.S. Appl. No. 15/640,466, Non Final Office Action mailed Oct. 5, 2017", 11 pgs.

"U.S. Appl. No. 15/640,466, Notice of Allowance mailed Jan. 28, 2019", 5 pgs.

"U.S. Appl. No. 15/640,466, Notice of Allowance mailed Dec. 26, 2018", 7 pgs.

"U.S. Appl. No. 15/640,466, Response filed Mar. 5, 2018 to Non Final Office Action mailed Oct. 5, 2017", 4 pgs.

"U.S. Appl. No. 15/640,466, Response filed Sep. 19, 2018 to Final Office Action mailed Apr. 3, 2018", 5 pgs.

"U.S. Appl. No. 15/640,466, Response filed Dec. 10, 2018 to Ex Parte Quayle Action mailed Oct. 15, 2018", 6 pgs.

"U.S. Appl. No. 15/640,467, 312 Amendment filed Dec. 10, 2018", 3 pgs.

"U.S. Appl. No. 15/640,467, Corrected Notice of Allowability mailed Oct. 22, 2018", 4 pgs.

"U.S. Appl. No. 15/640,467, Final Office Action mailed Apr. 3, 2018", 9 pgs.

"U.S. Appl. No. 15/640,467, Non Final Office Action mailed Oct. 4, 2017", 11 pgs.

"U.S. Appl. No. 15/640,467, Notice of Allowance mailed Oct. 3, 2018", 7 pgs.

"U.S. Appl. No. 15/640,467, PTO Response to Rule 312 Communication mailed Dec. 17, 2018", 2 pgs.

"U.S. Appl. No. 15/640,467, Response filed Mar. 5, 2018 to Non Final Office Action mailed Oct. 4, 2017", 4 pgs.

"U.S. Appl. No. 15/640,467, Response filed Sep. 23, 2018 to Final Office Action mailed Apr. 3, 2018", 6 pgs.

"U.S. Appl. No. 15/659,618, Non Final Office Action mailed Oct. 30, 2017", 11 pgs.

"U.S. Appl. No. 15/659,618, Notice of Allowance mailed Apr. 10, 2018", 7 pgs.

"U.S. Appl. No. 15/659,618, PTO Response to Rule 312 Communication mailed Jun. 19, 2018", 2 pgs.

"U.S. Appl. No. 15/659,618, Response filed Mar. 5, 2018 to Non Final Office Action mailed Oct. 30, 2017", 8 pgs.

"U.S. Appl. No. 15/984,359, Final Office Action mailed Jan. 2, 2019", 5 pgs.

"U.S. Appl. No. 15/984,359, Non Final Office Action mailed Sep. 24, 2018", 10 pgs.

"U.S. Appl. No. 15/984,359, Notice of Allowance mailed Apr. 1, 2019", 5 pgs.

"U.S. Appl. No. 15/984,359, Response filed Mar. 18, 2019 to Final Office Action mailed Jan. 2, 2019", 6 pgs.

"U.S. Appl. No. 15/984,359, Response filed Dec. 16, 2018 to Non Final Office Action mailed Sep. 24, 2018", 10 pgs.

"U.S. Appl. No. 16/004,348, 312 Amendment filed Feb. 12, 2020", 3 pgs.

"U.S. Appl. No. 16/004,348, Advisory Action mailed Jun. 5, 2019", 3 pgs.

"U.S. Appl. No. 16/004,348, Final Office Action mailed Apr. 1, 2019", 17 pgs.

"U.S. Appl. No. 16/004,348, Non Final Office Action mailed Aug. 8, 2019", 9 pgs.

"U.S. Appl. No. 16/004,348, Non Final Office Action mailed Oct. 30, 2018", 17 pgs.

"U.S. Appl. No. 16/004,348, Notice of Allowance mailed Nov. 14, 2019", 8 pgs.

"U.S. Appl. No. 16/004,348, Response filed Feb. 11, 2019 to Non Final Office Action mailed Oct. 30, 2018", 6 pgs.

"U.S. Appl. No. 16/004,348, Response filed May 27, 2019 to Final Office Action mailed Apr. 1, 2019", 10 pgs.

"U.S. Appl. No. 16/004,348, Response filed Jun. 23, 2019 to Advisory Action mailed Jun. 5, 2019", 10 pgs.

(56) References Cited

OTHER PUBLICATIONS

"U.S. Appl. No. 16/004,348, Response filed Oct. 31, 2019 to Non Final Office Action mailed Aug. 8, 2019", 5 pgs.

"U.S. Appl. No. 16/004,348, Supplemental Notice of Allowability mailed Mar. 9, 2020", 4 pgs.

"U.S. Appl. No. 16/231,520, Final Office Action mailed Apr. 10, 2019", 6 pgs.

"U.S. Appl. No. 16/231,520, Non Final Office Action mailed Jan. 30, 2019", 7 pgs.

"U.S. Appl. No. 16/231,520, Notice of Allowance mailed May 17, 2019", 5 pgs.

"U.S. Appl. No. 16/231,520, Notice of Allowance mailed Jul. 26, 2019", 5 pgs.

"U.S. Appl. No. 16/231,520, Response filed Mar. 27, 2019 to Non Final Office Action mailed Jan. 30, 2019", 6 pgs.

"U.S. Appl. No. 16/231,520, Response filed May 5, 2019 to Final Office Action mailed Apr. 10, 2019", 6 pgs.

"U.S. Appl. No. 16/275,366, Non Final Office Action mailed Apr. 1, 2019", 8 pgs.

"U.S. Appl. No. 16/275,366, Notice of Allowance mailed May 13, 2019", 7 pgs.

"U.S. Appl. No. 16/275,366, Response filed Apr. 21, 2019 to Non Final Office Action mailed Apr. 1, 2019", 3 pgs.

"U.S. Appl. No. 16/275,371, Non Final Office Action mailed Apr. 1, 2019", 10 pgs.

"U.S. Appl. No. 16/275,371, Notice of Allowance mailed May 10, 2019", 7 pgs.

"U.S. Appl. No. 16/275,371, Response filed Apr. 21, 2019 to Non Final Office Action mailed Apr. 1, 2019", 3 pgs.

"U.S. Appl. No. 16/275,907, Non Final Office Action mailed Apr. 10, 2019", 6 pgs.

"U.S. Appl. No. 16/275,907, Notice of Allowance mailed May 13, 2019", 5 pgs.

"U.S. Appl. No. 16/275,907, Response filed Apr. 21, 2019 to Non Final Office Action mailed Apr. 10, 2019", 3 pgs.

"U.S. Appl. No. 16/444,431, 312 Amendment filed Mar. 10, 2020", 3 pgs.

"U.S. Appl. No. 16/444,431, Non Final Office Action mailed Jul. 5, 2019", 11 pgs.

"U.S. Appl. No. 16/444,431, Notice of Allowance mailed Nov. 7, 2019", 5 pgs.

"U.S. Appl. No. 16/444,431, PTO Response to Rule 312 Communication mailed Mar. 16, 2020", 2 pgs.

"U.S. Appl. No. 16/444,431, Response filed Nov. 3, 2019 to Non Final Office Action mailed Jul. 5, 2019", 9 pgs.

"U.S. Appl. No. 16/444,464, Non Final Office Action mailed Jul. 9, 2019", 14 pgs.

"U.S. Appl. No. 16/444,464, Notice of Allowance mailed Oct. 11, 2019", 7 pgs.

"U.S. Appl. No. 16/444,464, Response filed Oct. 3, 2019 to Non Final Office Action mailed Jul. 9, 2019", 5 pgs.

"U.S. Appl. No. 16/662,657, Non Final Office Action mailed Dec. 19, 2019", 6 pgs.

"U.S. Appl. No. 16/662,657, Notice of Allowance mailed Mar. 23, 2020", 5 pgs.

"U.S. Appl. No. 16/662,657, Preliminary Amendment filed Nov. 15, 2019", 3 pgs.

"U.S. Appl. No. 16/662,657, Response filed Mar. 10, 2020 to Non Final Office Action mailed Dec. 19, 2019", 8 pgs.

"U.S. Appl. No. 16/736,848, 312 Amendment filed Aug. 4, 2020", 3 pgs.

"U.S. Appl. No. 16/736,848, Non Final Office Action mailed Feb. 11, 2020", 16 pgs.

"U.S. Appl. No. 16/736,848, Notice of Allowance mailed May 14, 2020", 7 pgs.

"U.S. Appl. No. 16/736,848, Response filed May 5, 2020 to Non Final Office Action mailed Feb. 11, 2020", 3 pgs.

"U.S. Appl. No. 16/788,792, Non Final Office Action mailed Apr. 3, 2020", 12 pgs.

"U.S. Appl. No. 16/788,792, Notice of Allowance mailed Oct. 22, 2020", 8 pgs.

"U.S. Appl. No. 16/788,792, Response filed Jun. 10, 2020 to Non Final Office Action mailed Apr. 3, 2020", 6 pgs.

"U.S. Appl. No. 16/788,845, 312 Amendment filed Aug. 16, 2020", 3 pgs.

"U.S. Appl. No. 16/788,845, Non Final Office Action mailed Mar. 6, 2020", 4 pgs.

"U.S. Appl. No. 16/788,845, Notice of Allowance mailed Jun. 15, 2020", 5 pgs.

"U.S. Appl. No. 16/788,845, PTO Response to Rule 312 Communication mailed Aug. 21, 2020", 2 pgs.

"U.S. Appl. No. 16/788,845, Response filed Jun. 2, 2020 to Non Final Office Action mailed Mar. 6, 2020", 5 pgs.

"U.S. Appl. No. 16/909,063, Non Final Office Action mailed Aug. 25, 2020", 8 pgs.

"U.S. Appl. No. 16/909,063, Notice of Allowance mailed Nov. 23, 2020", 5 pgs.

"U.S. Appl. No. 16/909,063, Response filed Nov. 8, 2020 to Non Final Office Action mailed Aug. 25, 2020", 5 pgs.

"U.S. Appl. No. 16/994,615, Non Final Office Action mailed Aug. 25, 2020", 17 pgs.

"U.S. Appl. No. 16/994,615, Notice of Allowance mailed Feb. 1, 2021", 7 pgs.

"U.S. Appl. No. 16/994,615, Response filed Nov. 8, 2020 to Non Final Office Action mailed Aug. 25, 2020", 3 pgs.

"U.S. Appl. No. 17/019,274, Non Final Office Action mailed Nov. 9, 2020", 8 pgs.

"U.S. Appl. No. 17/019,274, Notice of Allowance mailed Feb. 8, 2021", 5 pgs.

"U.S. Appl. No. 17/019,274, Response filed Jan. 28, 2021 to Non Final Office Action mailed Nov. 9, 2020", 5 pgs.

"U.S. Appl. No. 17/175,644, Notice of Allowance mailed Jun. 20, 2022", 9 pgs.

"U.S. Appl. No. 17/175,644, Supplemental Notice of Allowability mailed Jul. 7, 2022", 2 pgs.

"U.S. Appl. No. 17/183,395, Non Final Office Action mailed Jul. 28, 2021", 8 pgs.

"U.S. Appl. No. 17/183,395, Notice of Allowance mailed Dec. 20, 2021", 5 pgs.

"U.S. Appl. No. 17/183,395, Response filed Dec. 2, 2021 to Non Final Office Action mailed Jul. 28, 2021", 7 pgs.

"U.S. Appl. No. 17/327,690, Non Final Office Action mailed Apr. 5, 2022", 4 pgs.

"U.S. Appl. No. 17/327,690, Notice of Allowance mailed Jul. 18, 2022", 7 pgs.

"U.S. Appl. No. 17/327,690, Response filed Jul. 5, 2022 to Non Final Office Action mailed Apr. 5, 2022", 7 pgs.

"U.S. Appl. No. 17/654,714, Non Final Office Action mailed Dec. 15, 2023", 15 pgs.

"U.S. Appl. No. 17/654,714, Notice of Allowance mailed Mar. 4, 2024", 7 pgs.

"U.S. Appl. No. 17/654,714, Response filed Feb. 16, 2024 to Non Final Office Action mailed Dec. 15, 2023", 8 pgs.

"U.S. Appl. No. 17/934,735, Non Final Office Action mailed Apr. 13, 2023", 9 pgs.

"U.S. Appl. No. 17/934,735, Notice of Allowance mailed Feb. 7, 2024", 9 pgs.

"U.S. Appl. No. 17/934,735, Notice of Allowance mailed Aug. 10, 2023", 8 pgs.

"U.S. Appl. No. 17/934,735, Response filed Jun. 9, 2023 to Non Final Office Action mailed Apr. 13, 2023", 7 pgs.

Alwani, Rishi, "Microsoft and Nvidia Tech to Bring Photorealistic Games With Ray Tracing", Gadgets 360, [Online] Retrieved from the Internet: <URL: https://gadgets.ndtv.com/laptops/news/microsoft-dxr-nvidia-rtx-ray-tracing-volta-gpu-metro-exodus-1826988>, (Mar. 21, 2018), 8 pgs.

Beck, et al., "CPU-GPU hybrid real time ray tracing framework", vol. 0 (1981), (2005), 1-8.

Bikker, J, "Real-time ray tracing through the eyes of a game developer", In: Proceedings of the 2007 IEEE Symposium on Interactive Ray Tracing, Washington, DC, USA, IEEE Computer Society, (2007), 10 pgs.

(56) References Cited

OTHER PUBLICATIONS

Broecker, Markus, et al., "Adapting ray tracing to spatial augmented reality", Mixed and Augmented Reality (ISMAR), 2013 IEEE International Symposium on. IEEE, (2013).

Celarek, Adam, "Merging ray tracking and rasterization in mixed reality", Vienna University of Technology, (2012).

Chen, C. C, et al., "Use of hardware z-buffered rasterization to accelerate ray tracing", In: Proceedings of the 2007 ACM symposium on Applied computing. SAC '07, New York, NY, USA, ACM, (2007), 1046-1050.

Fredriksson, Johan, et al., "Generating Real Time Reflections by Ray Tracing Approximate Geometry", Chalmers University of Technology, Gothenburg, Sweden, (2016), 46 pgs.

Hanraman, et al., "Ray tracing on programmable graphics hardware", ACM Siggraph 2001 Proceedings, (2001), 703-712.

Jenson, Henrik Wann, et al., "Photon maps in bidirectional Monte Carlo ray tracing of complex objects", In Computers & Graphics, vol. 19, Issue 2, ISSN 0097-8493, (1995), 215-224.

Kajiya, J. T, "The rendering equation", In Proc. SIGGRAPH, vol. 20, No. 4, (1986), 143-150.

Kan, Peter, "Differential irradiance caching for fast high-quality light transport between virtual and real worlds", 2013 IEEE International Symposium on Mixed and Augmented Reality (ISMAR). IEEE, (2013).

Kan, Peter, et al., "High-quality reflections, reflections, and caustics in augmented reality and their contribution to visual coherence", Mixed and Augmented Reality (ISMAR), 2012 IEEE International Symposium on. IEEE, (2012).

McGuire, et al., "Efficient GPU screen-space ray tracing", Journal of Computer Graphics Techniques, vol. 3, No. 4, (2014), 13 pgs.

Parker, et al., "OptiX: a general purpose ray tracing engine", Journal ACM Transactions on Graphics-Proceedings of ACM SIGGRAPH 2010, vol. 29 Issue 4, Article No., (Jul. 4, 2010).

Peddie, Jon, "Peddie predicts we could have real time ray tracing on our PCs in less than 6 years", TechWatch, [Online] Retrieved from the Internet: <URL: https://www.jonpeddie.com/press-releases/peddie-predicts-we-could-have-real-time-ray-tracing-on-our-pcs-in-less-than/>, (Mar. 27, 2018), 2 pgs.

Sabino, Thales, et al., "A Hybrid GPU Rasterized and Ray Traced Rendering Pipeline for Real Time Rendering of Per Pixel Effects", ICEC 2012, Univ. Federal Fluminense, Rio de Janeiro, Brazil, (2013), 14 pgs.

Sadeghi, Iman, et al., "Coherent Path Tracing", Jensen University of California, San Diego, (2009), 12 pgs.

Santos, D, et al., "Real time ray tracing for augmented reality", 14th Symposium on Virtual and Augmented Reality IEEE, (May 28-31, 2012).

Wald, et al., "Interactive Rendering with Coherent Ray Tracing", Computer Graphics Forum, vol. 20, (Sep. 2001), 153-165.

Wald, et al., "Ray Tracing Animated Scenes using Coherent Grid Traversal", ACM, (2006).

Wald, et al., "Realtime Ray Tracing and its use for Interactive Global Illumination", Proceedings of Eurographics, (2003).

Wyman, Chris, "Voxelized shadow volumes", Proceedings of the ACM SIGGRAPH Symposium on High Performance Graphics, ACM, (2011), 34 pgs.

"U.S. Appl. No. 14/868,461, Response filed May 3, 2016 to Non Final Office Action mailed Jan. 5, 2016", 1 pg.

"U.S. Appl. No. 14/868,461, Final Office Action mailed Jun. 3, 2016", 7 pgs.

"U.S. Appl. No. 14/868,461, Response filed Aug. 29, 2016 to Final Office Action mailed Jun. 3, 2016", 1 pg.

"U.S. Appl. No. 14/868,461, Notice of Allowance mailed Sep. 13, 2016", 5 pgs.

"U.S. Appl. No. 14/868,461, Non Final Office Action mailed Jan. 5, 2016", 8 pgs.

"U.S. Appl. No. 14/479,322, Response filed May 21, 2015 to Notice of Non-Compliant Amendment mailed Apr. 29, 2015", 10 pgs.

"U.S. Appl. No. 14/479,322, Final Office Action mailed Jun. 4, 2015", 19 pgs.

"U.S. Appl. No. 14/479,322, Response filed Feb. 22, 2016 to Final Office Action mailed Jun. 4, 2015", 9 pgs.

"U.S. Appl. No. 14/479,322, Notice of Non-Compliant Amendment mailed Jul. 29, 2016", 3 pgs.

"U.S. Appl. No. 14/479,322, Response filed Aug. 15, 2016 to Notice of Non-Compliant Amendment mailed Jul. 29, 2016", 10 pgs.

"U.S. Appl. No. 14/479,322, Notice of Allowance mailed Aug. 29, 2016", 8 pgs.

"U.S. Appl. No. 18/047,546, Non Final Office Action mailed Mar. 21, 2024", 7 pgs.

"U.S. Appl. No. 14/479,322, Non Final Office Action mailed Jan. 22, 2015", 26 pgs.

"U.S. Appl. No. 14/479,322, Response filed Apr. 22, 2015 to Non Final Office Action mailed Jan. 22, 2015", 10 pgs.

"U.S. Appl. No. 14/479,322, Notice of Non-Compliant Amendment mailed Apr. 29, 2015", 2 pgs.

"U.S. Appl. No. 17/654,714, 312 Amendment filed Jun. 4, 2024", 3 pgs.

"U.S. Appl. No. 18/047,546, Response filed Jun. 11, 2024 to Non Final Office Action mailed Mar. 21, 2024", 8 pgs.

"U.S. Appl. No. 17/654,714, PTO Response to Rule 312 Communication mailed Jun. 17, 2024", 2 pgs.

"U.S. Appl. No. 18/047,546, Corrected Notice of Allowability mailed Jul. 22, 2024", 2 pgs.

"U.S. Appl. No. 18/047,546, Notice of Allowance mailed Jul. 10, 2024", 5 pgs.

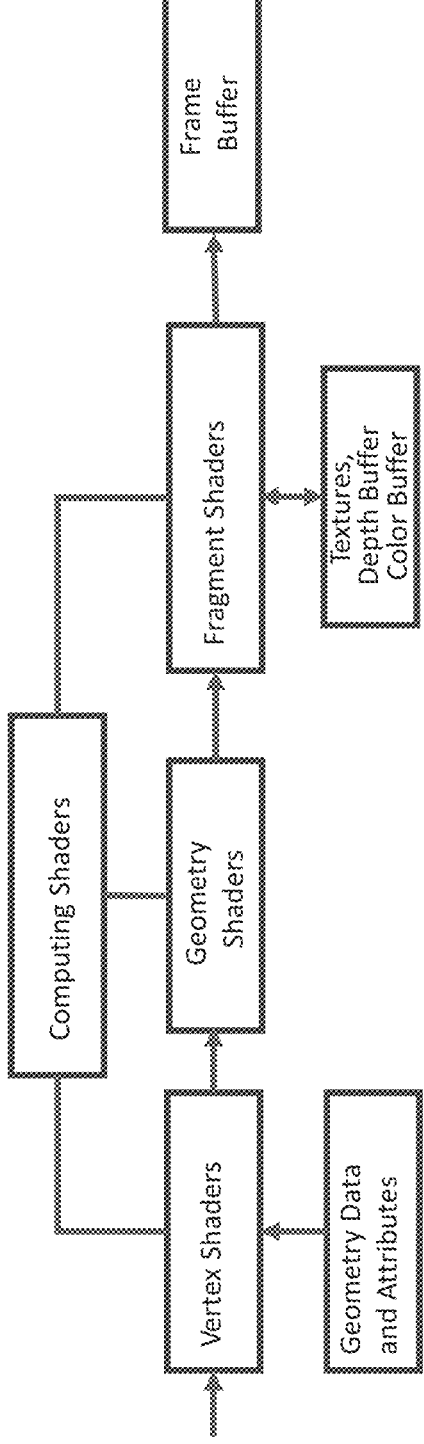
Fig. 16. Prior art – GPU graphics pipeline

SYSTEM FOR NON-PLANAR SPECULAR REFLECTIONS IN HYBRID RAY TRACING

CROSS-REFERENCE TO RELATED APPLICATIONS

This application is a continuation of U.S. patent application Ser. No. 17/654,714, filed Mar. 14, 2022, which is a continuation of U.S. patent application Ser. No. 17/183,395, filed Feb. 24, 2021, now issued as U.S. Pat. No. 11,302,058, which is a continuation of U.S. patent application Ser. No. 16/909,063, filed Jun. 23, 2020, now issued as U.S. Pat. No. 10,950,030, which is a continuation of U.S. patent application Ser. No. 16/662,657, filed Oct. 24, 2019, now issued as U.S. Pat. No. 10,699,468, which claims the benefit of priority to U.S. Provisional Application Ser. No. 62/755,548, filed Nov. 4, 2018, and U.S. Provisional Application Ser. No. 62/755,568, filed Nov. 5, 2018. U.S. patent application Ser. No. 16/662,657 is also a continuation-in-part of U.S. patent application Ser. No. 16/004,348, filed Jun. 9, 2018, now issued as U.S. patent Ser. No. 10/614,612; and is a continuation-in-part of U.S. patent application Ser. No. 16/444,464, filed Jun. 18, 2019, now issued as U.S. patent Ser. No. 10/565,776; and is a continuation-in-part of U.S. patent application Ser. No. 16/444,431, filed Jun. 18, 2019, now issued as U.S. patent Ser. No. 10/614,614. Each of the above applications are incorporated herein by reference in its entirety.

FIELD OF THE INVENTION

The present invention relates to new and improved way of carrying out ray tracing method at a reduced computational complexity.

BACKGROUND OF THE INVENTION

Ray tracing is a technique for computing visibility between points. Light transport algorithms simulate the way light-rays propagate through space (while interacting with objects), attaining the resulting colors for the screen pixels. Primary rays are shot from the screen to the scene intersecting with scene objects and generating secondary rays that bounce all over the scene according to the physical laws of optics. (Note: unless specifically stated otherwise, the general term secondary rays used herein throughout the specification discussions, refers to secondary, ternary, and higher degree rays).

Ray tracing is capable of producing a very high degree of visual realism, higher than that of typical raster methods, but at a greater computational cost. Ray tracing is superior to raster graphics by its capability to simulate a wide variety of optical effects, such as glossiness, specularity, radiosity, reflection and refraction, scattering, soft shadows and more. The prior art ray tracing is one of the most computationally complex applications. As such, it is best suited for applications where the image can be rendered slowly ahead of time, such as in still images and film and television visual effects, and is poorly suited for real-time animated application of augmented reality where the real time animation is critical.

Path tracing. The traditional ray tracing is not necessarily photorealistic. True photorealism occurs when the rendering equation is closely approximated or fully implemented. Implementing the rendering equation gives true photorealism, as the equation describes every physical effect of light flow. However, this depends on the available computing resources. Path tracing, referred to as a Monte Carlo ray tracing gives far more accurate simulation of real-world lighting. Traditional path tracers [Kajiya, J. T. 1986. *The rendering equation*. In Proc. SIGGRAPH] shoot rays through each pixel, stochastically scattering according to the profile of the intersected object's reflectance and continuing recursively until striking a light source. Repeated sampling for any given pixel in the image space will eventually cause the average of the samples to converge to the correct solution of a rendering equation, making it one of the most physically accurate 3D graphic rendering methods in existence. Path tracing can generate images that are indistinguishable from photographs. Its visual quality is higher than that of a simple ray tracing, but at a much greater computational cost. (Note: unless specifically stated otherwise, the general term ray tracing, used herein throughout the specification discussions, refers to path tracing.)

A path tracer continuously samples pixels of the screen space. Rays are distributed randomly within each pixel in screen space and at each intersection with an object in the scene a new reflection ray, pointing in a random direction, is generated. After some number of bounces each ray eventually exits the scene or is absorbed.

Path tracing is a global illumination technique. Global illumination takes into account not only the light that comes directly from a light source, but also light reflected by surfaces in the scene, whether specular, diffuse, or semi-reflective. FIG. 1 depicts the sampling of diffuse inter-reflection from the surrounding environment, at a given surface point. In order to achieve global illumination on a diffuse surface, sampling rays must be shot from a hit point (HIP) 10. HIP is a result of a previous encounter between a ray (primary or secondary) and a triangle. The sampling at the HIP is done by shooting many rays, each in a random direction, within the boundaries of a hemisphere 11. The hemisphere is oriented such that its north pole is aligned with the surface normal N.

The relation between the deviation of a sampling ray from the normal N in the hemisphere, and its contribution to the aggregated light energy, is shown in FIG. 2. It is strongly connected with the BRDF (bidirectional reflectance distribution function) of the surface material. BRDF is a function of four real variables that defines how light is reflected at an opaque surface. According to the Monte Carlo technique each of the hemisphere rays is shot from the same HIP but at random direction, bounded by the hemisphere of FIG. 1. As a result, ray's sampled data contributes to the aggregated light energy at the HIP, according to the BRDF function.

Hybrid ray tracing (ray tracing interlaced with raster rendering) is a deferred rendering process based on raster rendering to calculate the primary rays collision, while the secondary rays use a ray tracing approach to obtain shadow, reflection and refraction effects. This approach vastly improves ray tracing performance, not only because many unnecessary traditional ray tracing tasks are avoided, but also because a complete image is available in a demanded time, even if there is not enough time to finish calculations of all the visual effects.

The concept of a hybrid Real-Time Raster and Ray Tracer renderer is not new. Beck et al [Beck et al [Beck, S., c. Bernstein, A., Danch, D., Frohlich, B.: CPU-GPU hybrid real time ray tracing framework (2005)] proposes a CPU-GPU Real-Time Ray-Tracing Framework. Beck proposal spread the traditional stages of ray tracing in independent tasks for the GPU and CPU. These render tasks can be summarized into three GPU render passes: a shadow map generation pass, a geometry identification pass and a blur pass.

Bikker [Bikker, J.: Real-time ray tracing through the eyes of a game developer. In: Proceedings of the 2007 IEEE Symposium on Interactive Ray Tracing, Washington, DC, USA, IEEE Computer Society (2007)] developed a Real-Time Path Tracer called Brigade, which divides the rendering task seamlessly over both GPU and CPU available cores. Brigade aims the production of proof-of-concept games that use path tracing as the primary rendering algorithm.

Pawel Bak [Bak, P.: Real time ray tracing. Master's thesis, IMM, DTU (2010)] implements a Real-Time Ray Tracer using DirectX 11 and HLSL. Similar to Beck's work, his approach also uses rasterization in order to achieve the best possible performance for primary hits.

Chen [Chen, C. C., Liu, D. S. M.: Use of hardware z-buffered rasterization to accelerate ray tracing. In: Proceedings of the 2007 ACM symposium on Applied computing. SAC '07, New York, NY, USA, ACM (2007) 1046-1050] presented a hybrid GPU/CPU ray tracer renderer, where a Zbuffered rasterization is performed to determine the visible triangles at the same time that primary ray intersections are determined. The CPU reads the data back in order to trace secondary rays.

Sabino et al. [Thales Sabino, Paulo Andrade, Esteban Gonzales Clua, Anselmo Montenegro, Paulo Pagliosa, A Hybrid GPU Rasterized and Ray Traced Rendering Pipeline for Real Time Rendering of Per Pixel Effects, Univ. Federal Fluminense, Rio de Janeiro, Brazil, 2013] present a heuristic approach that select a subset of relevant objects to be ray traced, avoiding traversing rays for objects that might not have a significant contribution to the real time experience.

An important strategy in real-time hybrid ray tracing, is the use of GPU for raster techniques to improve the performance and a smart strategy for prioritizing regions and objects that will receive the ray tracing light effects. NVIDIA's OptiX [Parker, S. G., Bigler, J., Dietrich, A., Friedrich, H., Hoberock, J., Luebke, D., McAllister, D., McGuire, M., Morley, K., Robison, A., Stich, M.: Optix: A general purpose ray tracing engine. ACM Transactions on Graphics (August 2010)] is a general-purpose ray tracing engine targeting both NVIDIA's GPUs and general-purpose hardware in the current version. OptiX architecture offers a low-level ray tracing engine, a programmable ray tracing pipeline with a shader language based on CUDA C/C++, a domain-specific compiler and a scene-graph based representation. OptiX is a GPU only solution with remarkably good results for interactive ray tracing. Recently Nvidia OptiX has got a support by Nvidia RTX, which is a development platform for hybrid ray tracing, for a special purpose hardware. It runs on Nvidia Volta- and Turing-based GPUs, specifically utilizing an architecture for ray tracing acceleration.

Despite all the hybrid ray tracing developments, hybrid real-time ray tracers on low-power devices do not exist in prior art. Their applicability on low-power devices, such as laptops, tablets, hand-held mobiles, becomes more and more relevant. The likelihood of running ray tracing on low power devices is forecasted only to the thirties: "*By Moore's law alone by* 2032 *we could be running real time ray tracing on mobile phones.*" Jon Peddie, "Peddie predicts we could have real time ray tracing on our PCs in less than 6 years", TechWatch, 27 Mar. 2018.

The hurdles of path tracing that prevent a real-time performance in prior art, either of a full-blown ray tracing or of a hybrid ray tracing are: traversal and frequent reconstruction of accelerating structures, lack of coherence of secondary rays, and a noise causing a "film-grain" appearance of images.

Real-time Ray Tracing (RTRT). Historically, ray tracing had been reserved to off-line applications, such as computer-generated photo-realistic animated films. Real-time applications of video games, virtual and augmented reality had have to rely on rasterization for their rendering. RTRT is a hard-computational task, not only because each pixel in the image must be calculated separately, but also because the final color of a single pixel can be affected by more than one recursive ray. Another consideration is that ray tracing algorithms waste from 75% to 95% of its execution time calculating intersection points between rays and objects. RTRT has been enabled by Nvidia's RTX in 2018 (Alwani, Rishi. "Microsoft and Nvidia Tech to Bring Photorealistic Games With Ray Tracing". *Gadgets* 360. Retrieved Mar. 21, 2018), facilitating a new development in computer graphics of generating interactive images that react to lighting, shadows, reflections by special purpose hardware. Nvidia's RTX is based on traditional ray tracing algorithm accelerated by an on-chip supercomputing hardware of closely 5000 cores. It comprises of a GPU having 4352 cores, AI denoiser utilizing 544 cores, and intersection tests accelerator of 68 cores. The power requirement of a single RTX2080 GPU is 250 W, and the price starts at €418. Due to the high cost and high power of RTX it is targeted at the high-end video games.

However, there is a great need to enable real-time ray tracing on consumer class devices (smartphones, tablets, laptops and PC), for video games, VR and AR, democratizing ray tracing to the massive audience which includes limited powered devices. For this end a new and novel method, based on radical algorithmic improvements is needed. Reflections. In prior art's hybrid ray tracing the reflections are generated based on G-buffer (Luis Sabino et al., *A Hybrid GPU Rasterized and Ray Traced Rendering Pipeline for Real Time Rendering of Per Pixel Effects,* 2013). The G-Buffer is generated during the first stage by raster rendering, a "differed shading" stage. The basic idea behind deferred shading is to perform all visibility tests before performing any lighting computations. Therefore, at first, visibility tests are done by raster rendering, while shading is differed to a later stage, combined with ray tracing. The G-buffer produced by the deferred shading stage contains information about optical properties of the underlying material of each pixel. Its contents are used to determine the need for tracing reflection/refraction rays. It is composed by reflectivity, index of refraction, specular exponent and opacity, respectively. The rays need to be traced from the surfaces only through the scene. This way enables to avoid trace of unnecessary rays in places where the material is neither refractive nor reflective. After differed shading is done, the ray tracing algorithm starts with secondary rays and can follow its own path. Any secondary ray generated will be traced against scene in order to produce global illumination effects, such as reflections and refractions. The result of this stage can be understood as the generation of a ray trace effects layer. This effects layer will be blended to the image already generated, in order to improve its visual quality with global illumination effects.

According to the G-buffer method the secondary rays are a natural extension of primary rays. Ray tracing that is carried-on by the chosen secondary rays suffer from the same difficulties of conventional ray tracing: lack of coherence of secondary rays and images with stochastic noise.

Lack of ray coherence of secondary rays. Coherence of rays is the key to efficient parallelization of ray tracing. In prior art ray tracing the primary and shadow rays are coherent. This coherence is exploited for efficient parallel processing: traversing, intersecting, and shading by packets of coherent rays. They work well for nearby primary rays, since these rays often traverse similar parts of the accelerating data structure. Using this approach, we can reduce the compute time by using SIMD instructions on multiple rays in parallel, reduce memory bandwidth by requesting data only once per packet, and increase cache utilization at the same time. This works fine for primary rays that originate from the camera. Unfortunately, it is not possible to use ray packets effectively with rays of an advanced order (secondary, ternary, etc.). The primary reason is that advanced order rays bounce in different direction losing coherence. Moreover, in path tracing there is an intentional randomization of rays for diffuse reflections. Reorganizing secondary rays to form bundles with higher coherence ratios, are practiced by the prior art. But this kind of regrouping is a quite expensive operation since it involves a scatter/gather step, which may result in only a slight frame rate improvement when reordering is applied.

Sadegi et al. [Iman Sadeghi, Bin Chen, and Henrik Wann, Coherent Path Tracing, Jensen University of California, San Diego, 2009], developed a technique for improving the coherency of secondary rays. This technique uses the same sequence of random numbers for generating secondary rays for all the pixels in each sample. This improves the efficiency of the packet tracing algorithm but creates structured noise patterns in the image.

Noisy images. A path tracer continuously samples pixels of the screen space. The image starts to become recognizable after only a multiple samples per pixel. Rays are distributed randomly within each pixel in screen space and at each intersection with an object in the scene a new reflection ray, pointing in a random direction, is generated. After some number of bounces each ray eventually exits the scene or is absorbed. When a ray has finished bouncing about in the scene a sample value is calculated based on the objects the ray bounced against. The sample value is added to the average for the source pixel.

The random components in ray tracing cause the rendered image to appear noisy. The noise decreases over time as more and more samples are calculated. The defining factor for render quality is the number of samples per pixel (SPP). The higher SPP you have in a rendered image the less noise will be noticeable. However, the added quality per sample decreases the more samples you have already (since each sample is just contributing to an average over all samples). The difference in image quality between, for example, 20,000 SSP and 21,000 SSP will not be as noticeable as between 1,000 SSP and 2,000 SSP.

The initial high screen resolution transforms to a low spatial resolution that decreases quickly as the rays are progressing deeper into the space. Due to the low spatial resolution each one of the produced frames is noisy. Only converge of many subsequent frames reduces the final image noise. The image to converge and reduce noise to acceptable levels usually takes around 5000 samples for most path traced images, and many more for pathological cases. Noise is particularly a problem for animations, giving them a normally unwanted "film-grain" quality of random speckling.

Accelerating structures. The most time-consuming tasks in ray tracing are intersection tests between millions of rays and millions of polygons. They are partly relieved by use of acceleration structures (AS) which are huge binary trees. Every single ray is traversed across an accelerating structure (e.g. K-trees or BVH trees), seeking polygons for intersection. These traversals become a major time-consuming task—they typically take over 70% of the image generation time. The polygons near to the path of the traversing ray are subject to intersection test.

The AS based on binary trees are basically static. They are constructed in a preprocessing step. Such a step takes typically much more time than rendering an image. The construction time depends on the scene size. Every major modification of the scene necessitates a reconstruction of the static acceleration structures. Moreover, the memory size is typically doubled by these structures.

There are two major drawbacks associated with the use of static acceleration structures; (i) traversals of these structures are time-consuming, challenging the real-time requirements, and (ii) they must be repeatedly reconstructed upon scene changes, which contradicts with real time animation. Reconstructing static acceleration structure is a computationally intensive task, preventing real-time animation.

SUMMARY OF THE PRESENT INVENTION

The present invention teaches a real-time hybrid ray tracing method for non-planar specular reflections.

The prior art hybrid ray tracing inherits the main hurdles of the classic ray tracing: incoherence of secondary rays, noisy images and lack of real-time animation.

In the hybrid ray tracing of present invention, these hurdles of prior art have been eliminated by: (i) high coherence of secondary rays, and (ii) dynamic acceleration structures that replace the prior art's static ones.

According to the basic principle of ray tracing the reflection effects are modelled by secondary and higher order rays. In prior art, according to the G-buffer method of hybrid ray tracing, secondary rays are a natural extension of primary rays. Secondary rays, that survived the reduction of unnecessary rays in places where the material is neither refractive nor reflective, follow their own path against the scene. The paths from non-planar surfaces are much more dispersed than from planar ones. As such, there is no way to control these rays for coherence or reduced noise.

The present invention deals only with reflections from non-planar objects. The planar reflection has been described in a previous patent application U.S. Ser. No. 16/004,348 Fast Path Traced Reflections for Augmented Reality, to which the present invention claims priority. The bouncing direction of secondary rays is deterministic for perfectly specular (reflective) surfaces, or random (see FIG. 1) for diffuse (glossy) surfaces. The current invention deals with specular (reflective) non-planar reflections.

According to the present invention, the high complexity of non-planar surface is reduced to low complexity of multiple small planar surfaces. Advantage is taken of the planar nature of triangles that comprise building blocks of a non-planar surface. All secondary rays bouncing from a given triangle toward object triangles keep a close direction to each other. A collective control of secondary rays is enabled by this closeness and by decoupling secondary rays from primary rays. The result is high coherence of secondary rays.

BRIEF DESCRIPTION OF THE DRAWINGS

The invention is herein described, by way of non-limiting examples only, with reference to the accompanying figures and drawings, wherein like designations denote like elements. Understanding that these drawings only provide information concerning typical embodiments of the invention and are not therefore to be considered limiting in scope:

FIG. 16. Prior art-GPU graphics pipeline

DETAILED DESCRIPTION OF THE PRESENT INVENTION

Figure 1:
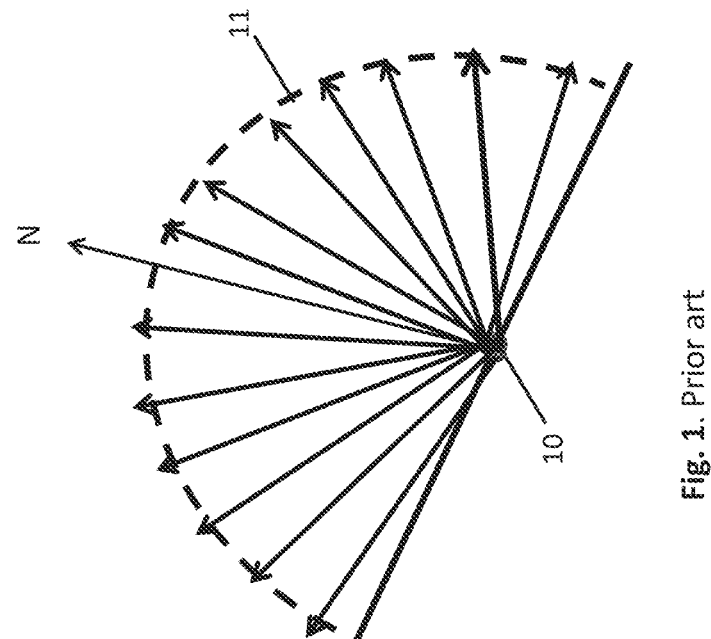
FIG. 1. Prior art. Hemisphere of diffuse reflection used in path tracing.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and devices. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

Unless specifically stated otherwise, as apparent from the following discussions, it is appreciated that throughout the specification discussions, utilizing terms such as "processing", "computing", "calculating", "determining", "generating", "creating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as processor, computer, apparatus, system, sub-system, module, unit, and device (in single or plural form) for performing the operations herein. This may be specially constructed for the desired purposes, or it may contain a general purpose computer selectively activated or reconfigured by a computer program stored in the computer. Several technical terms specifically associated with our disclosure are herein defined.

Computer graphics pipeline refers to the most common form of computer 3D rendering, 3D polygon rendering, distinct from raytracing, and ray casting. In particular, in ray casting, a ray originates at the point where the camera resides, if that ray hits a surface, then the color and lighting of the point on the surface where the ray hit is calculated. In 3D polygon rendering the reverse happens, the area that is in view of the camera is calculated, and then rays are created from every part of every surface in view of the camera and traced back to the camera. The graphics pipeline is usually used in real-time rendering.

Rendering a projection is a 3D computer graphics process of automatically converting 3D wire frame models into 2D images rendering on a computer. The projection can be of a perspective, parallel, inverse or of another shape.

Render target is a feature of modern graphics processing units (GPUs) that allows a 3D scene to be rendered to an intermediate memory buffer, or Render Target Texture (RTT), instead of the frame buffer or back buffer. This RTT can then be manipulated by pixel shaders in order to make searches or apply effects to the final image.

Primary rays, are the first generation of rays in ray tracing, cast into the scene from camera or from eye to solve for visibility, i.e. to find whether the primary ray intersects a surface.

Secondary rays in ray tracing are spawned from primary rays at ray-polygon intersection points. They are used to compute things like shadows, reflections, refractions, etc. Herein, we use the term collectively for all successive generations as well, such as for ternary rays, fourth generation, etc.

Global illumination, is a general name of a group of algorithms used in 3D computer graphics that are meant to add more realistic lighting to 3D scenes, taking into account not only the light that comes directly from a light source (direct illumination), but also subsequent cases in which light rays from the same source are reflected by other surfaces in the scene, whether reflective or not (indirect illumination).

Color bleeding in computer graphics is the phenomenon in which objects or surfaces are colored by reflection of indirect light from nearby surfaces. This is a visible effect that appears when a scene is rendered with full global illumination.

Accelerating structures, such as grids, octrees, binary space partitioning trees (BSP trees), kd-trees and BVHs (bounding volume hierarchy), are used in ray tracing to solve for visibility, allowing improvement of render times in speed and efficiency, as compared to naïve ray tracing without accelerating structures.

Object can stand for a primitive (polygon, triangle, solid, etc.), or a complex object made out of primitives.

Hit point is a point where a ray intersects an object. Termed also HIP.

Visibility—given a set of obstacles in the Euclidean space, two points in the space are said to be visible to each other, if the line segment that joins them does not intersect any obstacles.

Scene, a collection of 3D models and light sources in world space, into which a camera may be placed, describing a scene for 3D rendering. Scene model elements include geometric primitives: points or vertices; line segments or edges; polygons or faces.

Clipping, in the context of computer graphics, is a method to selectively enable or disable rendering operations within a defined region of interest.

Surface triangle (termed also receiving triangle)—in Computer Graphics triangles are the primitive elements of any 3D object. In the present invention, for short, surface triangles are used for the primitives of a reflective surface.

Object triangle—in Computer Graphics triangles are the primitive elements of any 3D object. In the present invention, for short, object triangles are used for the primitives of an object that is processed for reflection in a reflective surface.

SIMD—(single instruction multiple data) is a class of parallel computers in Flynn's taxonomy. It describes computers with multiple processing elements that perform the same operation on multiple data points simultaneously. SIMD is particularly applicable to common tasks of Computer Graphics. Modern GPU designs include SIMD instructions to improve the performance.

Specular reflection—is the mirror-like reflection of light from a surface. In this process, each incident ray is reflected at the same angle to the surface normal as the incident ray, but on the opposing side of the surface normal in the plane formed by incident rays. The result is that an image reflected by the surface is reproduced in mirror-like (specular) fashion. Throughout the present invention a specular surface is also termed reflective surface.

Diffuse reflection—is the reflection of light from a surface such that a ray incident on the surface is scattered at many angles rather than at just one angle as in the case of specular reflection. Termed also Glossy throughout the present invention.

Phantom camera—as opposed to the real camera from which the 3D scene is viewed. Phantom camera is a reflected location of the real camera in a specific virtual plane. It is used in present invention to generate an alternative reflection.

The processes/devices and displays presented herein are not inherently related to any particular computer or other apparatus, unless specifically stated otherwise. Various general-purpose systems may be used with programs in accordance with the teachings herein, or it may prove convenient to construct a more specialized apparatus to perform the desired method. The desired structure for a variety of these systems will appear in the description below. In addition, embodiments of the present invention are not described with reference to any particular programming language. It will be appreciated that a variety of programming languages, graphics APIs, or operating systems may be used to implement the teachings of the inventions as described herein.

In hybrid ray tracing global illumination effects, such as reflections, are produced by secondary rays. The result of secondary stage can be understood as generation of a ray traced reflection layer by secondary rays. This layer is blended to the image already generated by raster projection of primary rays, in order to improve its visual quality with a global illumination effect.

In prior art once primary rays are shot at the scene, secondary rays need to be traced continuing the path from the primary hit points through the scene in the direction of light sources, generating reflections. The parallel processing of secondary rays is limited due to incoherence of secondary rays, particularly in the case of non-planar surfaces.

Due to high coherence of secondary rays, the present invention enables a highly parallel processing of ray tracing. High coherence is gained by handling the secondary rays collectively and decoupling them from primary rays. As a result, the secondary rays are coherent, well suited for SIMD mechanisms. Furthermore, due to coherence of secondary rays and initial scene covering by primary rays, the stochastic noise is eliminated.

During the scene-design the surfaces that are candidates to reflect, either specular or diffuse, are selected as receiving (reflective) surfaces on which reflections are generated. These receiving surfaces might be planar (U.S. Ser. No. 16/004,348) or non-planar (current invention).

Figure 4:
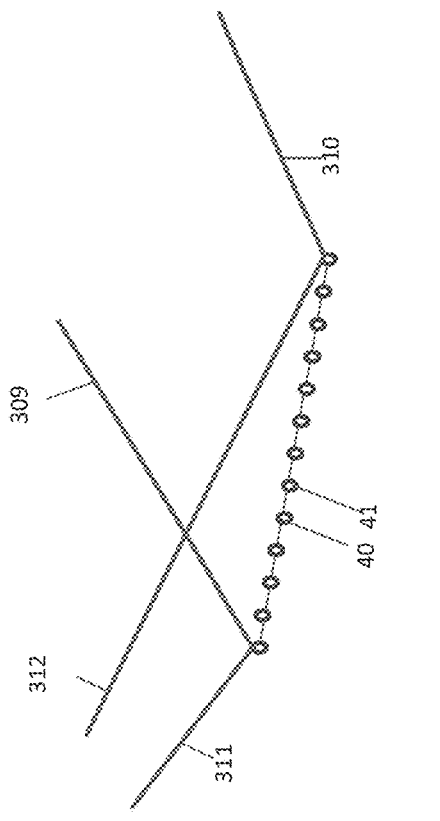
FIG. 4. HIPs covering surface triangle.
Figure 3:
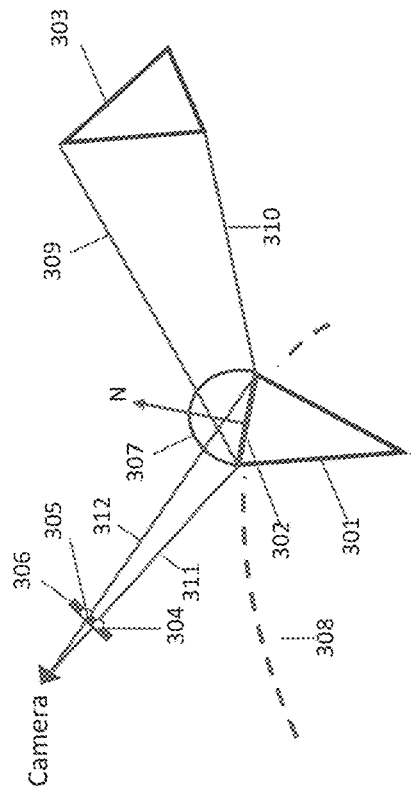
FIG. 3. The principle of the method, including the surface and object triangles, primary and secondary rays.

The principle of the method of present invention is illustrated in FIG. 3. A non-planar receiving surface 308 as well as the reflected object 303 consist of triangles and are handled as triangles. Each receiving triangle of the non-planar surface, such as 301, is handled separately. Triangle 303 represents an object to be reflected in the receiving triangle 301. During the initial phase, primary rays (between rays 311-312) hit the receiving triangle, creating multiple primary hit points, e.g. 41 and 42 in FIG. 4. The secondary rays are created collectively as an independent beam (between rays 309-310), targeted at the object 303. At the first stage they are decoupled from the primary hit points and treated collectively.

This opposes the prior art where HIPs are taken as an explicit start-point for secondary rays, such that each newly created secondary ray becomes an unambiguous continuation of its originator, primary ray. Moreover, each continuing secondary ray is handled individually, following its own path against the scene. In non-planar surfaces these paths are highly dispersed, hence incoherence of secondary rays.

Note: secondary is used in its broad meaning: between secondary and primary rays, or between ternary and secondary, etc. For the sake of simplicity, in the upcoming text we denote secondary and primary rays, but the same description can be applied to other couples of ray generations as well.

Figure 6:
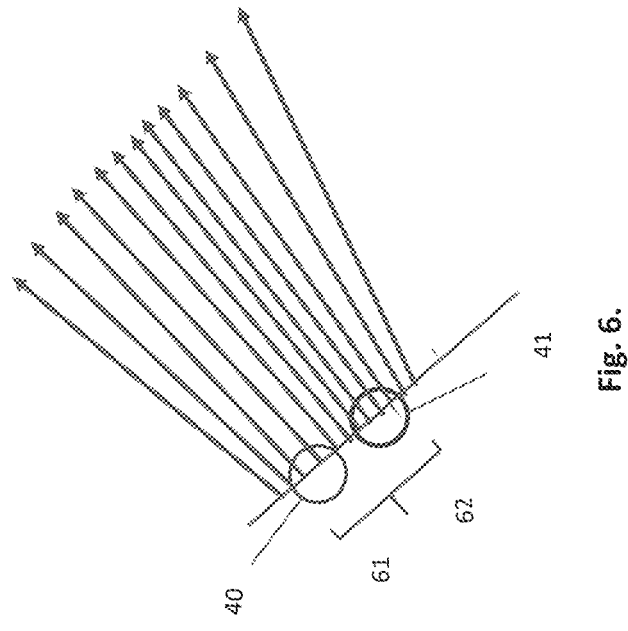
FIG. 6. Matching secondary rays to primary HIPs.

According to present invention, bundles of secondary rays are generated and handled separately for each of the surface triangles, taking advantage of their planar nature. Since all secondary rays bouncing from a given triangle keep a close direction, they are handled collectively as part of a common projection. But during the final collecting stage each of the secondary rays is matched to one of the primary rays, for delivering the collected light values to image pixels. An embodiment of secondary-to-primary matching of present invention is illustrated in FIGS. 5-6.

Figure 5:
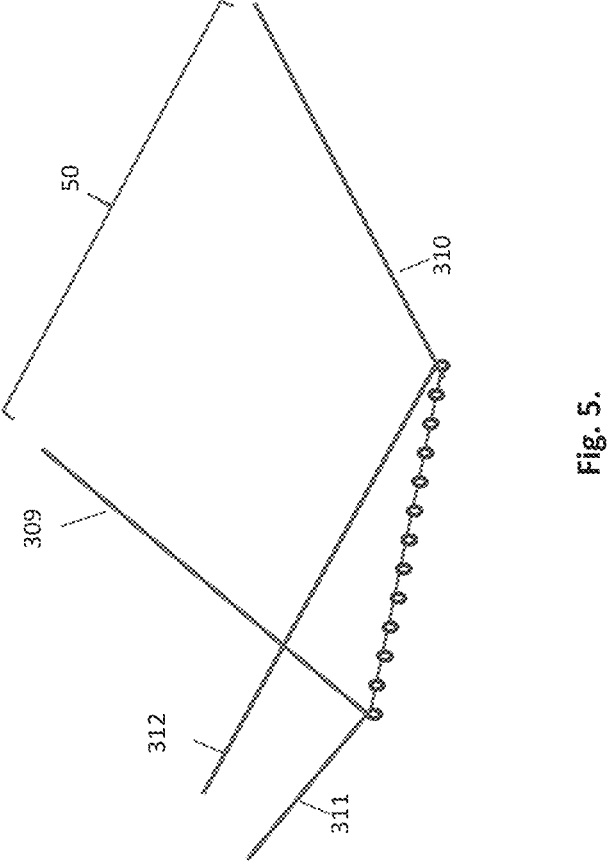
FIG. 5. Primary and secondary rays relating to surface triangle.

In FIG. 5 a beam 50 of secondary rays shot from receiving triangle toward a reflected object is shown. The secondary rays may outnumber the HIPs of primary rays. The way the secondary rays, after collecting the light values from the reflected object, are matched to primary rays is shown in FIG. 6. Two HIPs are shown, 40 and 41. The secondary rays are matched with primary rays by their nearness; rays in the bundle 61 are matched to 40, while 62 are matched to 41.

Figure 7:
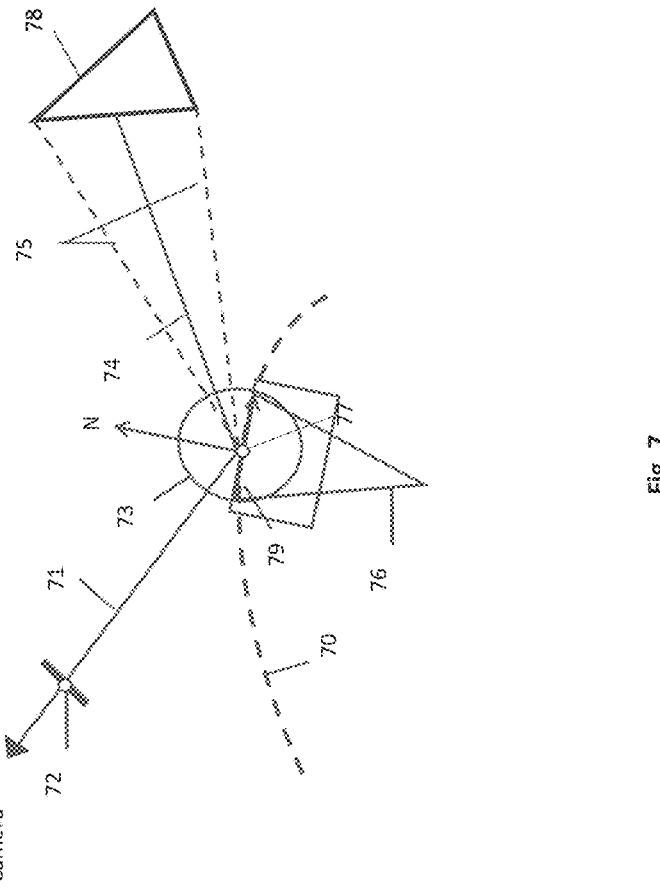
FIG. 7. Non-planar setup of surface triangle with single primary and single secondary ray.

In FIG. 7, a single primary ray 71 is shot at a receiving triangle 76, hitting it at HIP 77. Then secondary ray 74, which is part of the beam of secondary rays 75, is in a proximity to primary HIP 77, intersected by the primary ray 71. These two rays are matched sharing their collected light values. The shown HIP's hemisphere 73 is in use for diffuse (glossy) non-planar surfaces.

It should be noted that the number of secondary rays in the segment may be arbitrary, according to the needs. The more rays, the higher the spatial resolution.

Figure 8:
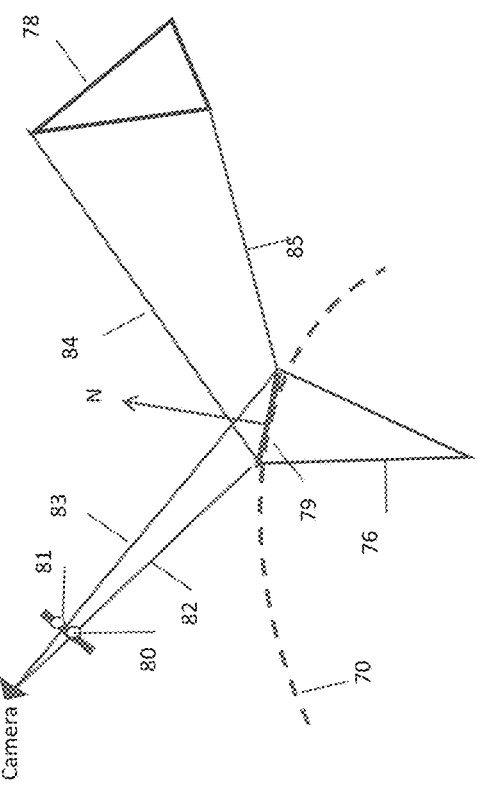
FIG. 8. Non-planar setup of surface triangle with beam of primary and beam of secondary rays.

While FIG. 7 refers only to a single primary ray and single secondary ray that can be matched around a single point on the receiving triangle 76, FIG. 8 refers to all primary rays and all secondary rays on the same triangle setup. A beam of primary rays bounded by 82-83 is shot to the receiving triangle 76, and a beam of secondary rays is generated from the receiving triangle to the object triangle 78.

Figure 2:
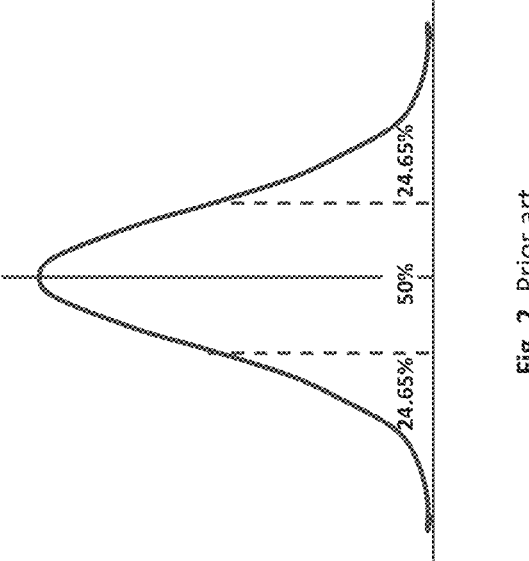
FIG. 2. Prior art. Statistical distribution on a unit hemisphere.
Figure 9:
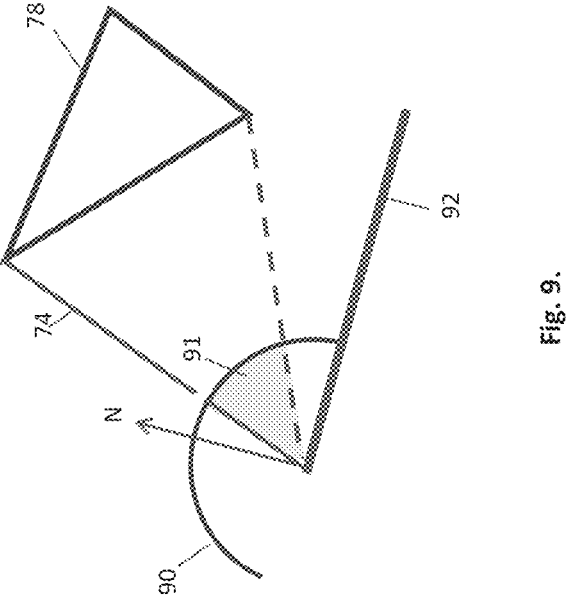
FIG. 9. Point of visibility from surface triangle.

For diffuse (glossy) reflection, for each secondary ray originating at surface 79, its own hemisphere 73 is used. There is room for multiple secondary rays in the hemisphere, each of its own visibility of the object triangle 78, according to ray's direction. The entire range of visibility of the object triangle from the hemisphere of ray 74 is shown in FIG. 9. The hemisphere section 91 is the loci of many possible secondary rays shot from the same origin on the surface 92 in varying directions, all having visibility of the object-triangle 78. Each ray in the segment can be weighted differently according to its importance (distance from the normal N on the hemisphere), BRDF of the material and a statistical distribution on a unit hemisphere (FIG. 2).

Figure 10:
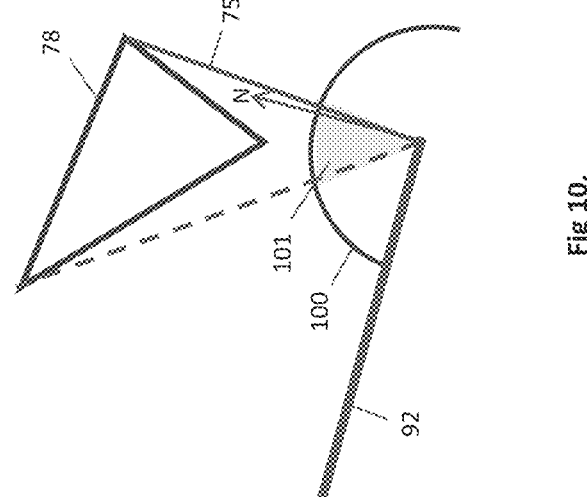
FIG. 10. Another point of visibility from surface triangle.

For comparison, FIG. 10 shows another secondary ray 75, shot from another point of the same surface 92, having a different hemisphere section of visibility. The use of hemisphere of FIG. 1 applies to diffuse (glossy) reflections only. For specular reflections a single deterministic secondary ray from each point at the receiving triangle is shot, and the use of hemisphere does not apply.

Figure 11:
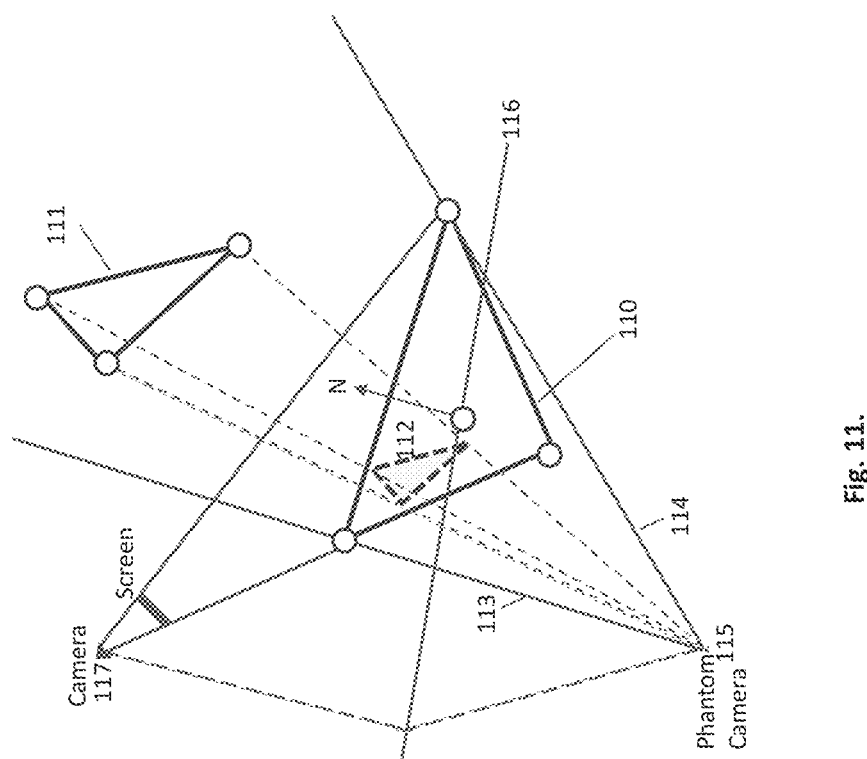
FIG. 11. Reflection of object triangle in surface triangle.

Calculating specular reflection of object 111 on receiving triangle 110 is illustrated in FIG. 11. A single deterministic secondary ray from each point of the receiving triangle is shot, comprising a ray belonging to the perspective projection 113-114. A weighted normal N of the receiving triangle 110 is calculated by interpolating the receiving-triangle's normals at each of its vertices. A virtual plane 116 perpendicular to the weighted normal N is calculated, and a location of a phantom camera is defined 115, to reflect the original camera 117 at the virtual plane 116. This phantom camera is the origin of the projection related to the receiving-triangle 110. Such a projection is shown 112 bounded by the rays 113, 114. The object triangle 111, as it is visible from the receiving triangle 110 is projected on the triangle's face, when its vertices define the reflected image 112 of the object. The object triangle must be transformed to the surface of the receiving triangle. The most efficient way to perform such transformation is by the vertex shader of a GPU graphics pipeline.

Figure 12:
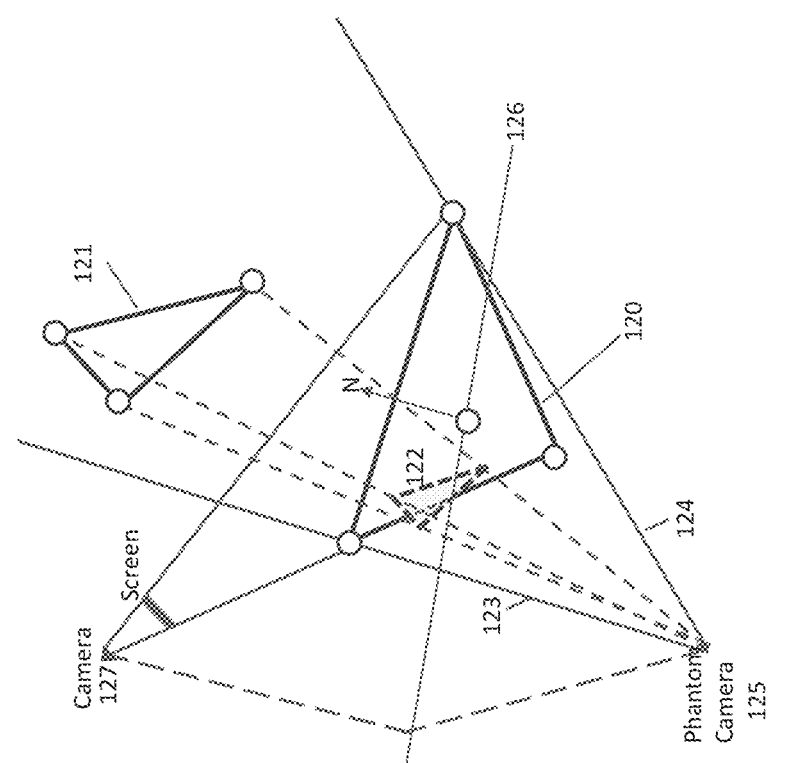
FIG. 12. Clipped reflection of object triangle in surface triangle.

A slightly different case of a specular reflection, when the reflected triangle does not entirely fall within the receiver-triangle, is illustrated in FIG. 12. In such a case the reflected object 122 must undergo a clipping according to the receiver's boundaries, as shown.

Figure 13B:
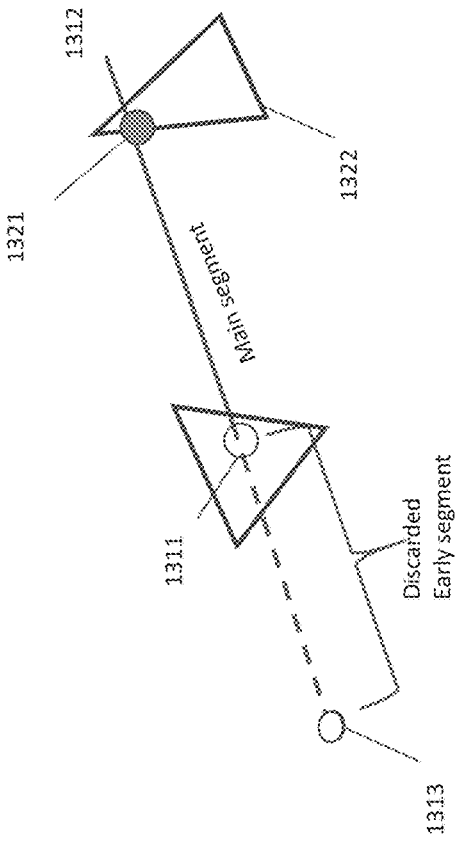
FIG. 13*b*. Creation of secondary ray, main segment.
Figure 13B:
Figure 13A:
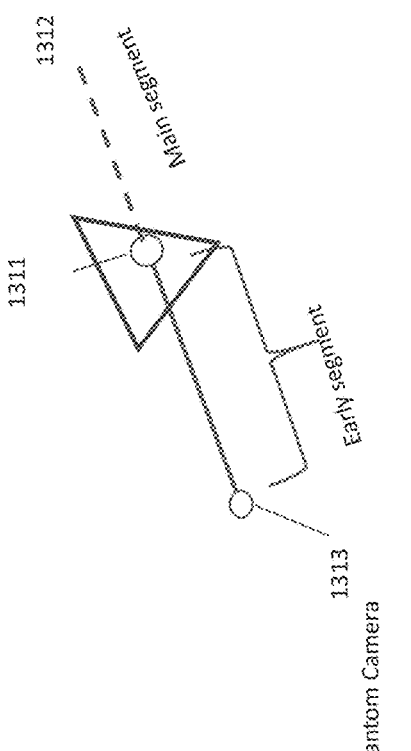
FIG. 13*a*. Creation of secondary ray, early segment.

In order to reach the reflected object from the receiving triangle by a regular raster projection mechanism, the projection from the phantom camera toward the receiving triangle and farther to the reflected object is done in two steps. In the first step a relative depth map of the receiving triangle from the phantom camera is generated, for filtering out any object that might befall between them two. This depth map is utilized as a guiding mask to enable concentrating on the main segment of the secondary ray 1312, starting at point 1311 and excluding the early segment, as shown in FIG. 13a. As shown in FIG. 13b, the main segment of the secondary ray intersects the object triangle 1322 at 1321.

Figure 14:
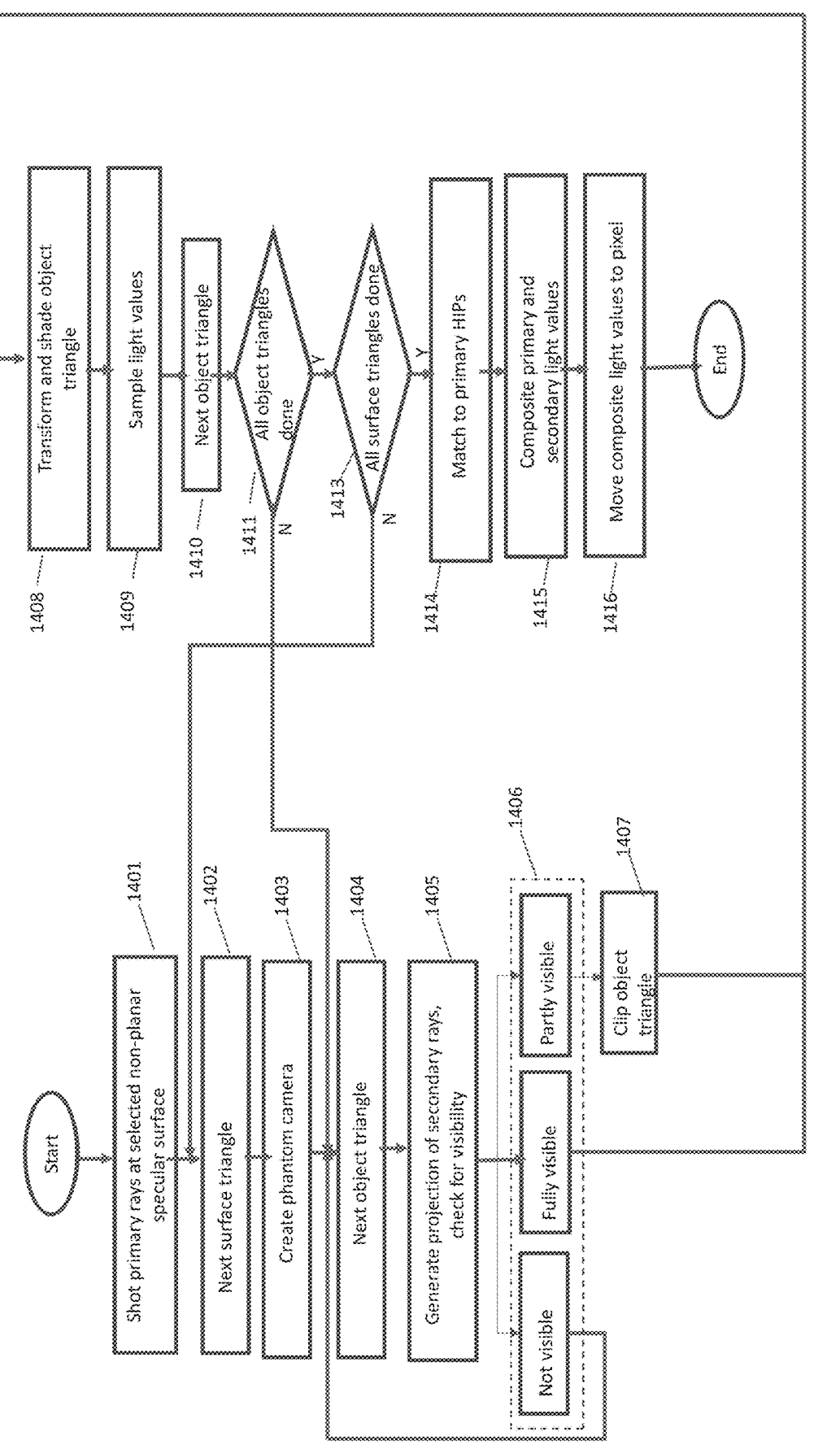
FIG. 14. Flowchart of embodiment of present invention.

The method is summarized in the flowchart of FIG. 14. As a preprocessing step the scene designer selects in the scene non-planar surfaces as candidates for specular reflectivity and per each surface selects objects to be reflected in the surface. In run time, per each selected surface, primary rays are shot to cover the surface with primary HIPs 1401. These primary HIPs do not serve as direct bouncing points for secondary rays, they are matched in a final stage. The non-planar receiving surface is treated by its triangles, which are planar entities. Per each surface triangle 1402 a location of phantom camera is calculated 1403, projection is done from the phantom camera, going through the surface triangle and intersecting with secondary rays the object triangles. All object triangles are processed one by one for each surface triangle 1404. Visibility is tested for each object triangle by ray/polygon intersection tests 1405. There are three optional test results 1406: (i) not visible, then the test passes to the next object triangle, (ii) partly visible, then clipping of the object triangle to the surface triangle must be performed 1407, and (iii) fully visible. The last two options are followed by geometric transformation of the object triangle to the receiving triangle (and clipping to the receiving triangle if required), and shading 1408. Light values are sampled at the intersection points between secondary rays and the object triangle 1409. When current surface triangle is done with all object triangles 1411, next surface triangle is taken. When all surface triangles are done 1413, all the secondary rays are matched with primary HIPs 1414, the light values of the primary and secondary rays are composited 1415, and the composited results are transferred to the respective image pixel 1416.

Figure 15:
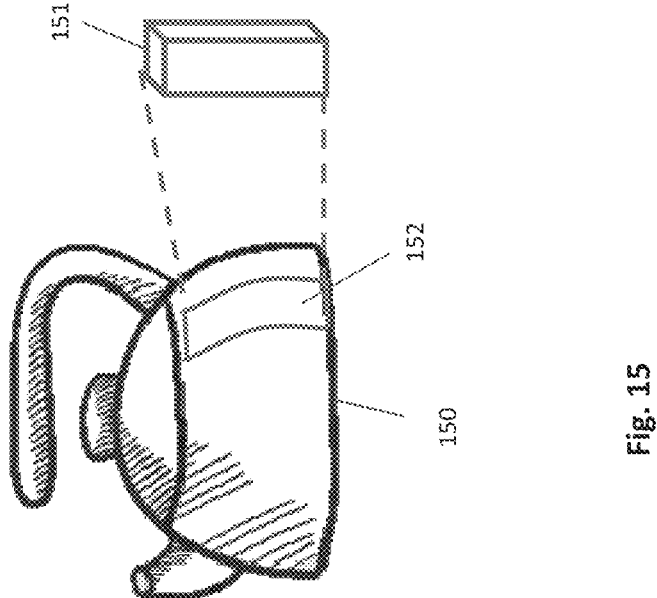
FIG. 15. An example of reflected object in specular non-planar surface.

FIG. 15 depicts an example of reflected object on a specular non-planar surface. The reflective surface of the kettle 150 consists of mesh of polygons (mesh not shown) on which an object 151 is reflected. The reflected object is treated as a mesh of triangles.

The method of the present invention is based on multiple projections, geometric transformations, texture wrapping and general computing. Although 3D rendering can be accomplished by CPU, but the most efficient way for above tasks is by graphics pipeline of GPU. FIG. 16 shows a prior art graphics pipeline. The GPU graphics pipeline executes the most common form of 3D rendering, as required by the present invention. The above tasks are performed by vertex, geometry, computing and fragment shaders. Moreover, as the present invention eliminates the incoherence of secondary rays, using the GPUs is the best alternative due to its parallel nature by its concept. For example, the most recent Nvidia RTX2080 GPU comprises 4352 processing cores (unified shaders). Their supercomputing level of processing can be exploited only by utmost parallelism which is enabled by present invention's coherence of secondary rays. Thus, GPU is well suited for the required tasks of present invention.

What is claimed is:

1. A method comprising:
   causing projection of one or more primary rays on a non-planar surface;
   computing a location of a phantom camera;
   generating, based on the location of the phantom camera, a plurality of secondary rays in response to projection of the one or more primary rays on the non-planar surface; and
   determining, using the plurality of secondary rays, visibility from the location of the phantom camera of an individual object triangle, the visibility comprising one or more of not visible, partly visible, and fully visible.

2. The method of claim 1, comprising:
   testing visibility of object triangles comprising the individual object triangle by intersecting the plurality of secondary rays with other object triangles.

3. The method of claim 1, wherein the plurality of secondary rays bouncing, from surface triangles of the non-planar surface, is decoupled from the one or more primary rays.

4. The method of claim 1, further comprising:

generating the one or more primary rays for each triangle of triangles forming the non-planar surface, wherein the one or more primary rays are first projected to a respective one of the triangles and further, as secondary rays, to one or more other triangles of an object; and transforming or shading a surface of each triangle.

5. The method of claim 4, further comprising:

transforming or shading light values for each of the secondary rays;

compositing the light values; and transferring the composited light values to respective image pixels.

6. The method of claim 1, further comprising:

transforming or shading light values for a subset of the plurality of secondary rays;

compositing the light values; and transferring the composited light values to respective image pixels.

7. The method of claim 1, wherein each triangle of the non-planar surface is treated separately as a planar surface.

8. The method of claim 1, wherein the plurality of secondary rays is shot from each triangle of the non-planar surface.

9. The method of claim 1, comprising:

in response to determining that visibility comprises not visible, processing a next object triangle.

10. The method of claim 1, comprising:

in response to determining that visibility comprises partly visible, clipping the individual object triangle to a surface triangle.

11. The method of claim 1, comprising:

in response to determining that visibility comprises fully visible, transforming and shading the individual object triangle.

12. The method of claim 1, wherein light values are sampled at intersection points between the plurality of secondary rays and object triangles.

13. The method of claim 1, wherein the plurality of secondary rays are matched with the one or more primary rays based on hit points created by the one or more primary rays on the non-planar surface.

14. The method of claim 1, wherein light values contributed by the plurality of secondary rays create a ray traced reflection layer.

15. The method of claim 14, wherein the ray traced reflection layer is composited with the light values of a raster projection of the one or more primary rays.

16. A system comprising:

a memory storing instructions; and one or more processors that execute the instructions stored in the memory to perform operations comprising:

causing projection of one or more primary rays on a non-planar surface;

computing a location of a phantom camera;

generating, based on the location of the phantom camera, a plurality of secondary rays in response to projection of the one or more primary rays on the non-planar surface; and determining, using the plurality of secondary rays, visibility from the location of the phantom camera of an individual object triangle, the visibility comprising one or more of not visible, partly visible, and fully visible.

17. The system of claim 16, the operations further comprising performing hybrid ray tracing generating reflections of objects in a non-planar specular surface utilizing a graphics processing unit.

18. The system of claim 16, the operations further comprising:

generating the one or more primary rays for each triangle of triangles forming the non-planar surface, wherein the one or more primary rays are first projected to a respective one of the triangles and further, as secondary rays, to one or more other triangles of an object; and transforming or shading a surface of each triangle.

19. The system of claim 16, wherein the plurality of secondary rays shot from each surface triangle are treated collectively.

20. A non-transitory computer-readable medium comprising computer-readable instructions that, when executed by one or more processors, configure the one or more processors to perform operations comprising:

causing projection of one or more primary rays on a non-planar surface;

computing a location of a phantom camera;

generating, based on the location of the phantom camera, a plurality of secondary rays in response to projection of the one or more primary rays on the non-planar surface; and determining, using the plurality of secondary rays, visibility from the location of the phantom camera of an individual object triangle, the visibility comprising one or more of not visible, partly visible, and fully visible.

\*      \*      \*      \*      \*